United States Patent [19]
Zuppiger

[11] 3,747,534
[45] July 24, 1973

[54] PLATFORM CONVEYORS
[75] Inventor: Paul Zuppiger, Geneve, Switzerland
[73] Assignees: Battelle Memorial Institute, Carouge/Geneve, Switzerland; Dunlop Holdings Ltd., London, England
[22] Filed: Apr. 26, 1971
[21] Appl. No.: 137,243

[30] Foreign Application Priority Data
Apr. 29, 1970 Great Britain.................. 20,730/70

[52] U.S. Cl.................................. 104/25, 198/110
[51] Int. Cl............................................ B65g 15/22
[58] Field of Search ............... 104/18, 25; 198/110, 198/181

[56] References Cited
UNITED STATES PATENTS
3,236,191 2/1966 Bouladon et al...................... 104/25
3,238,893 3/1966 Zuppiger........................... 104/18 X
3,580,182 5/1971 Bouladon............................. 104/25

Primary Examiner—Robert J. Spar
Attorney—Stevens, Davis, Miller & Mosher

[57] ABSTRACT

A platform conveyor having a high speed section, an intermediate variable speed section and a low speed section in which the platforms slide laterally relative to each other in the variable speed section wherein at least two carriages support each platform and guide rails and pivotal connections are provided between each carriage and the platforms.

7 Claims, 4 Drawing Figures

PLATFORM CONVEYORS

This invention relates to the support, and guidance, of mobile platforms, particularly as used for conveyors for transport of passengers and/or freight.

In particular, the present invention relates to platform conveyors comprising a slow speed zone or zones, a high speed zone or zones, and an intermediate variable speed zone or zones. The platforms are elongated in plan form and in the slow speed zone move in a direction which is generally normal to the longitudinal axes of the platform, i.e., generally parallel to the lateral axes of the platforms, with the platforms being in substantial alignment and in contact along their longitudinal edges. In the high speed zone the platforms travel in a direction which is sharply inclined to the lateral axes of the platforms, the platforms having moved laterally with respect to each other. In the intermediate zones, the platforms follow a curve, the relative lateral movement of the platforms occurring while traversing the curve.

The platforms are supported, and guided, on rails, by means of carriages. Because of the change in direction of movement of the platforms, with the lateral movement relative to each other, the distance between the carriages and the guide rails, in a direction normal to the direction of travel, varies, and certain problems of mountings, support and stability arise.

According to one aspect of the present invention a conveyor comprises a plurality of platforms adapted to travel along a predetermined path, the platforms being of elongated plan form and having parallel longitudinal edges, the path of the conveyor including a high speed section, a low speed section and an intermediate variable speed section, the platforms being adapted to slide laterally relative to one another in a direction parallel to their longitudinal axes in the variable speed section, and, at least two support carriages adapted to support each of the said platforms upon guide rails wherein each support carriage comprises a pivotal connection to the platform such that the platform may pivot on each support carriage about an axis substantially normal to the load carrying surface of the platforms.

Two pivotal supports may be used for each platform, one at each end. The pivotal support may be provided at one end of the support carriages in which case it is advantageous to have one pivotal support at the leading or front end of its associated carriage and the other pivotal support at the trailing or rearward end of its associated carriage.

In another aspect of the invention the pivotal supports are provided immediately adjacent to connecting and support means between adjacent platforms.

The invention also provides a carriage for such a conveyor. The carriage may have a resilient body member and/or may have its wheels resiliently mounted.

Furthermore the carriage may comprise pairs of wheels, one above and one below the guide rail, at each end of the carriage, each pair being resiliently loaded to ensure continuous contact with the guide rails.

Further aspects of the invention will be apparent from the following description, by way of example only, of some embodiments, of the invention in conjunction with the accompanying drawings in which.

Figure 1:
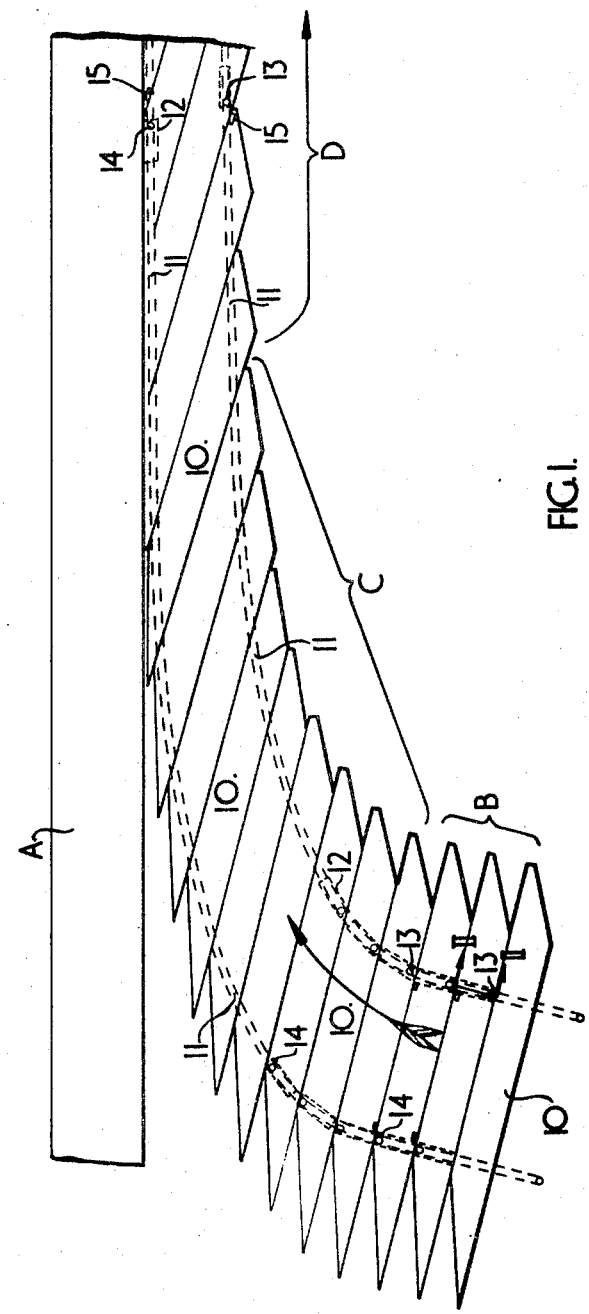
FIG. 1 is a plan view of a section of the platform conveyor used to accelerate a load to a speed substantially equal to that of a constant speed conveyor.

In FIG. 1 there is illustrated a conveyor intended for the loading of passengers and/or freight onto a constant speed high speed main conveyor A. The conveyor according to the present invention comprises a constant speed slow-speed entry section B onto which passengers or freight enter. Entry section B is followed by an intermediate section C where acceleration occurs, this section then being followed by a constant high speed section D. In the present example, the speed of section D conforms to the speed of the main conveyor A, and passengers or freight transfer onto the main conveyor A from section D.

The platforms 10 are of elongated plan form having inclined side edges reasons reasons to be explained later. The rails supporting and guiding the platforms are indicated at 11, and the carriages attached to the platforms and running by means of rollers 9, having an arcuate groove around the outer surface, on the rails 11 are indicated at 12. Lateral or sideways, sliding of the platforms, relative to each other, occurs as the platforms traverse the intermediate section C which in the present example is an acceleration zone. It will be noted that the rails 11 are closer together in the high speed section D than in the slow speed section B. Also it is necessary for the carriages 12 to pivot and become inclined relative to the transverse axes of the platforms.

As illustrated in FIG. 1, with the conveyor curving to the right, the carriages on the right-hand ends of the platforms are attached at their rear ends, in the direction of platform motion, by pivots 13. The carriages on the left-hand ends are attached at their front ends, in the direction of platform motion, by pivots 14. Also it will be seen that the carriages are mounted asymmetrically being offset towards the left-hand ends of the platforms, as seen in FIG. 1.

By attaching the carriages in this way, several advantages are obtained. Wider tracking of the carriages is obtained in the high-speed zone than if the carriages were attached at positions midway along their length. If the carriages were all attached at their front ends, then they would be closer together in the high speed section, reducing the support which they provide to the platforms.

A further advantage arises in that it is necessary to provide some connecting means for connecting the platforms together, at least in the sections in which passengers, or freight, are carried. As the platforms slide laterally relatively to each other, the connecting means must accept this sliding. It can be arranged that the connecting means are positioned adjacent the attachment positions of the carriages to the platforms giving good support and good stability. Suitable connecting means are described and claimed in U. S. Pat. No. 3,695,183 entitled Sliders and Rocking Arrangements for Integrator Platforms by Paul Zuppiger and assigned to the assignee of the present invention.

As described previously, and as seen in FIG. 1, the ends of the platforms are inclined. This provides in the high speed section D a continouus surface without gaps between the platforms and the belt A thus avoiding a saw-toothed edge formation along the edge of the conveyor. With the carriages attached as described, it can be arranged that the connecting means are positioned, in the high speed section, to support the ends of the triangular sections of the platforms, formed by the inclined ends. The connecting and supporting means are indicated at 15 in FIG. 1.

The connecting and supporting means 15, are normally attached to one platform, adjacent the related pivot 13 or 14, and slide in engagement with the adjacent platform. Thus the pivotal attachment positions of the carriages are very close to the sliding connections and support means and the loads transmitted to the pivotal attachments are kept to a minimum. Also, with the pivotal attachments being adjacent to the sides of the platforms, it is enabled that the loadings on the pivoted attachments are always in the same direction, facilitating design of the carriages and improving stability.

It is a feature that as the platforms accelerate in the acceleration zone, with the lateral movement of the platforms, the support positions of the platforms become spaced further apart, in the direction of movement, reaching their maximum spacing in the high speed zone. This assists stability in the high speed zone, in particular in that any irregularities in the track surface are not so pronounced in the high speed section, as the pivoting effect is reduced.

While FIG. 1 has been described as an arrangement for accelerating passengers, and freight, for eventual transfer to a main high speed conveyor, a similar arrangement can be used for off-loading from a main conveyor, with deceleration. For example. the arrangement illustrated in FIG. 1 could operate in reverse, with section C a deceleration zone. Also it is possible for a conveyor to comprise the slow speed section, an acceleration section and then a main constant speed high speed section for use as a main conveyor, followed by a deceleration section and a low speed section, there not being a separate high speed main conveyor.

Figure 2:
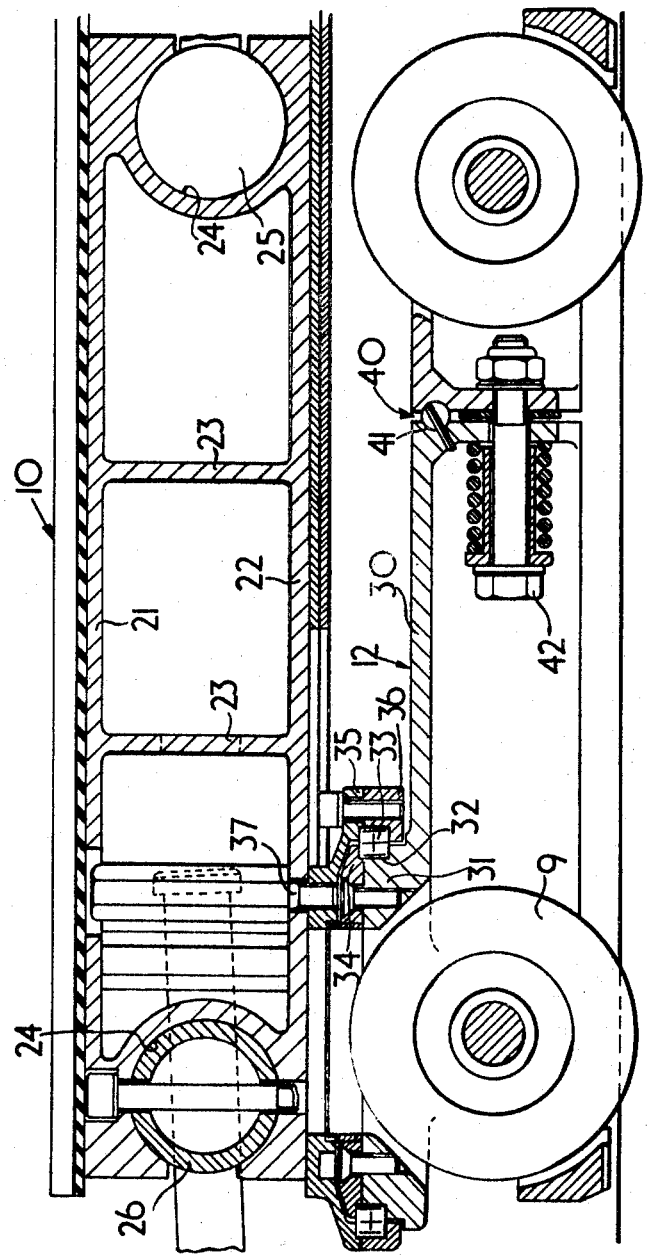
FIG. 2 is a sectional view of a platform and carriage on the line II—II of FIG. 1.

The platform, indicated generally at 10 in FIG. 2, comprises a hollow box-like cross-section having upper and lower surfaces 21 and 22 and internal webs 23. The ends of the section, which form the longitudinal edges of the platform, are formed with cylindrical recesses 24, for the reception of sliding connecting means 25 in one end, and locking means 26 in the other end. The sliding connecting means 25 is one particular form of connecting means, as indicated at 15 in FIG. 1, and other forms can be used. The locking means 26 is associated with the sliding connecting means 25 and is of a particular form, which may vary, and forms no part of the present invention.

The carriage, indicated generally at 12, comprises a main body member 30, carrying rollers 9 at each end. At one end the member 30 is formed with a boss 31 adapted to receive in a groove 32 on its outer circumferences a ball or roller bearing 33 mounted such that its axis intersects the rotational axis of the roller 9. The inner race of the bearing 33 is retained by a clamp ring 34. The boss 31 extends generally vertically of the main body member 30 and is cylindrical in form having the outer groove 32 extending around its curved surface near the top of the boss which acts as an inner track for the portions or rollers of bearing 33 mounted concentrically with the boss. The track may preferably be formed partly in the boss 31 and partly in clamping ring 34. The outer race of the bearing 33 is held in a housing 35 and a retaining disc 36 with the housing 35 attached to the platform by bolts 37. Bolts 37 are inserted through holes 38 in the bottom surface 22 and screw into threaded holes in the housing 35. The bearings 33 are of large diameter for the loading, and give good support to the platforms.

To provide flexibility in the carriage the main body portion 30 is divided into two parts, at 40. The parts are connected by a pivot 41, comprising a rod seated in grooves formed in opposed surfaces of the parts, and by a spring-loaded bolt 42. Conveniently the body 30 can be produced in one piece, as by casting, with a web formed at the position where the body is to be divided. A hole is then drilled through the body at the web, to form the grooves for reception of the rod, and then the body is divided by sawing.

Figure 3:
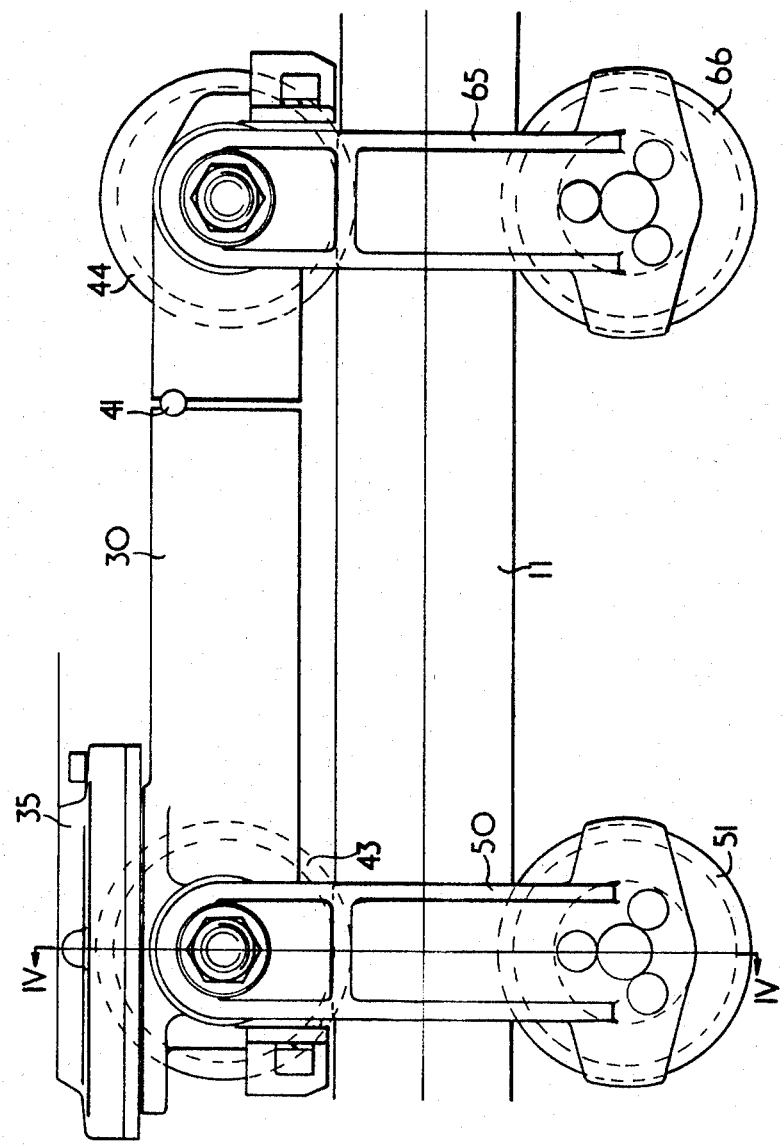
FIG. 3 shows a similar view including a second set of rollers of an alternative carriage construction.
Figure 4:
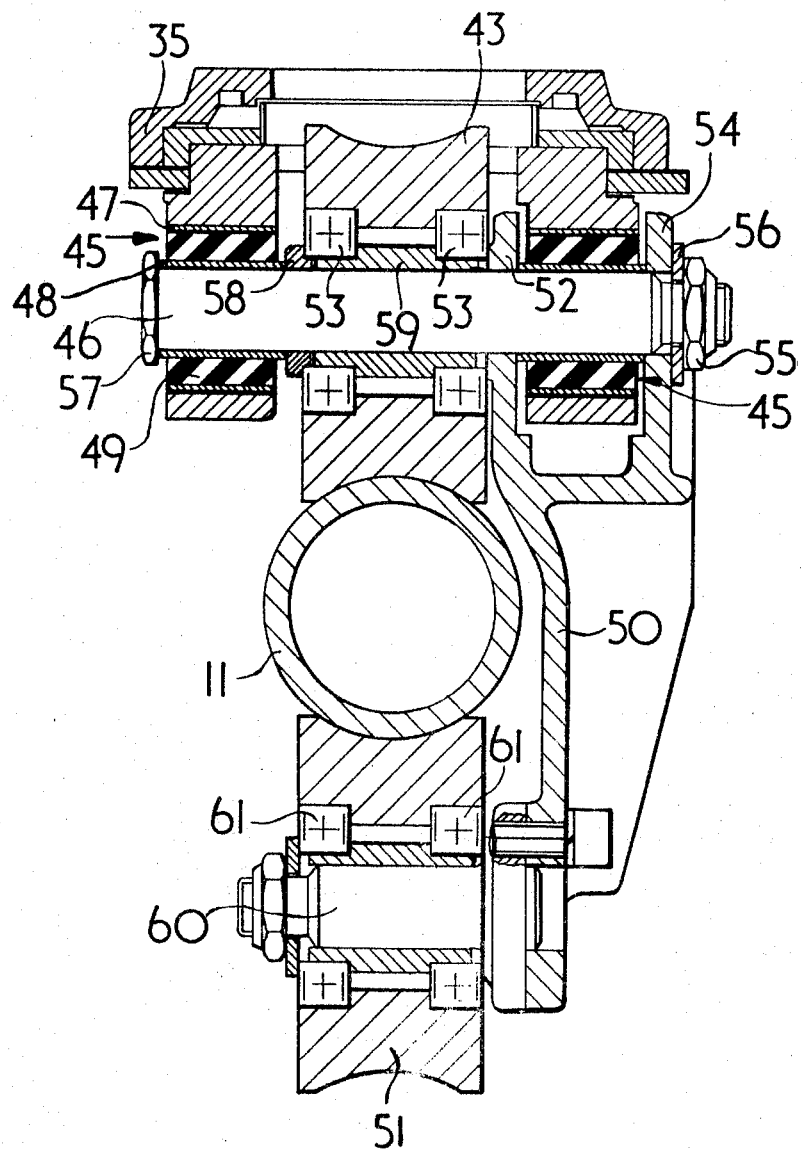
FIG. 4 is a section on the line IV—IV of FIG. 3.

Other forms of pivotal attachment of the carriage can be used, without ball or roller bearings. FIGS. 3 and 4 illustrate more fully the form of a carriage, but with a plain bearing. FIG. 3 is a side view of a carriage and shows the main body 30, with pivot 41 and the housing 35 by which the carriage is attached to the platform.

Rollers 43 and 44 are mounted at each end of the body 30. FIG. 4 illustrates in more detail a cross-section on the line 4—4 of FIG. 3. As seen in FIG. 4 two bushes 45 are mounted in the body, and support an axle 46. Bushes 45 are of a resilient form comprising co-axial metal tubes 47, 48 having an annular member 49 of rubber, or similar material bonded therebetween. Tubes 47 are a tight fit in the body member 30 and the tubes 48 are a loose fit on the axle 46 but are gripped as hereinafter described.

In addition to mounting the roller 43, the axle 46 also supports a lever 50 which in turn mounts a further roller 51. Lever 50 has a forked upper end with the inner limb 52 of the fork in contact with the inner race of one of the two bearings 53 supporting roller 43 and inside the bush 45. The outer limb 54 is positioned outside of one of the bushes 45 and the tube 48 of this bush is positioned between the limbs 52 and 54. The end of the axle 46 adjacent the lever 50 is threaded and carries a nut 55 and a washer 56. The other end of the axle 46 has an enlarged head 57 which bears on one end of the other end of the tube 48 of the other bush 45. The inner end of this tube 48 bears against a ring 58 which in turn is in contact with the inner-race of the other bearings 53. The inner races of the bearings 53 are also carried in recesses in a central sleeve 59. On tightening the nut 55, the limbs 52 and 54 of the lever grip one of the tubes 48 and the other tube 48 is gripped between the bolt head 57 and the ring 58. Thus the axle 46 is resiliently supported in the body 30 as is also the lower end 50. Roller 51 having a profile shaped to correspond and engage with the side rails 11, is mounted on the lower end of the lever 50 by means of an axle 60, with bearings 61.

A similar form of mounting is provided at the other end of the body 30 to mount roller 44, lever 65 and roller 66. In addition to resiliently mounting the rollers 43 and 44 and the lever 50 and 65, the bushes 45 are preloaded torsionally on assembly. The preloading tends to cause the levers 50 and 65 to rotate on the axles 46, in opposite directions, to move the rollers 51 and 66 closer together, maintaining the rollers in contact with the rail 11.

The form of the carriage, and its form of attachment to the platform, is independent of the condition of attachment, i.e., whether attached at its forward end or rearward end. In use the end having the housing 35 attached thereto will be the forward end for carriages on one side of the platforms and the rearward end for carriages on the other side of the platforms.

The mounting of the carriages provides a very stable platform, giving good support to the platform at all times. The resilient mounting of the rollers gives a stable, smooth ride, and also permits the platforms to travel round curves in planes other than horizontal, for example round vertical curves for recirculation back from one end of a conveyor to another.

What I claim is:

1. A conveyor comprising a plurality of platforms adapted to travel along a predetermined path, the platforms being of elongated plan form and having parallel longitudinal edges, the path of the platforms including a high speed section, a slow speed section and an intermediate variable speed section, the platforms being adapted to slide laterally relative to one another in a direction parallel to their longitudinal axes in the variable speed sections, and, at least two support carriages adapted to support each of said platforms upon guide rails wherein each support carriage comprises a pivotal connection to an end of the platform such that the platform may pivot on each support carriage about an axis substantially normal to the load carrying surface of the platforms and wherein the pivotal connection of each support carriage is positioned at one end of the carriage.

2. A conveyor as in claim 1 wherein the connection at one end of the platform is to the forward end of one carriage in the direction of motion of the platforms and the connection at the other end of the platform is to the rearward end of the other carriage in the direction of motion of the platforms so that a widely spaced support is provided for the platform.

3. A conveyor as in claim 1 wherein one of said carriages comprises first supporting rollers adapted for running on one side of a guide rail and wherein the pivotal connection of said one carriage has an axis which passes through the rotational axis of one of said first rollers of said one carriage.

4. A conveyor as in claim 3 wherein said one carriage comprises a body member having two parts interconnected by a hinge having an axis parallel to the rotational axes of said first rollers, and spring loaded means for restricting movement about said hinge.

5. A conveyor as in claim 3 wherein said one carriage comprises a body member and wherein each of said first rollers is mounted on a first axle, each first axle being resiliently mounted in the body member of the one carriage.

6. A conveyor as in claim 5 wherein the resilient mounting of the axle in the body member is by means of an elastomeric bush between the outer diameter of the axle and the inner surface of a hole in the body member to accommodate the axle.

7. A conveyor as in claim 5 further comprising second rollers mounted on the opposite side of the guide rail where said first rollers contact the guide rail, said first and second rollers each being rotatably mounted, respectively, on said first axles and second axles parallel to one another, and lever members having one end connected to said first axles and the other end connected to said second axles.

* * * * *